US012380362B2

(12) United States Patent
Ananthanarayanan et al.

(10) Patent No.: US 12,380,362 B2
(45) Date of Patent: Aug. 5, 2025

(54) CONTINUOUS LEARNING MODELS ACROSS EDGE HIERARCHIES

(71) Applicant: Microsoft Technology Licensing, LLC, Redmond, WA (US)

(72) Inventors: Ganesh Ananthanarayanan, Seattle, WA (US); Yuanchao Shu, Kirkland, WA (US); Paramvir Bahl, Bellevue, WA (US); Tsuwang Hsieh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1033 days.

(21) Appl. No.: 17/362,115

(22) Filed: Jun. 29, 2021

(65) Prior Publication Data

US 2022/0414534 A1 Dec. 29, 2022

(51) Int. Cl.
*G06N 20/00* (2019.01)
*G06N 3/08* (2023.01)

(52) U.S. Cl.
CPC .............. *G06N 20/00* (2019.01); *G06N 3/08* (2013.01)

(58) Field of Classification Search
CPC ........ G06N 20/00; G06N 20/10; G06N 20/20; G06N 3/045; G06N 3/08; G06N 3/10;
(Continued)

(56) References Cited

U.S. PATENT DOCUMENTS 8,874,477 B2 * 10/2014 Hoffberg .............. G06Q 20/065
705/37
11,893,012 B1 * 2/2024 Appalaraju .............. G06N 3/08
(Continued)

FOREIGN PATENT DOCUMENTS

CA 3098703 A1 * 11/2019 ........... G06F 9/5061
CA 3060144 A1 * 4/2020 ........... G06K 9/6256
(Continued)

OTHER PUBLICATIONS

Sudharsan, et al., "Edge2Train: A Framework to Train Machine Learning Models (SVMs) on Resource-Constrained IoT Edge Devices", In Proceedings of the 10th International Conference on the Internet of Things , Oct. 6, 2020, pp. 1-8.
(Continued)

*Primary Examiner* — Steven P Sax

(57) ABSTRACT

Systems and methods are provided for continuous learning of models across hierarchies under a multi-access edge computing. In particular, an on-premises edge server, using a model, generates inference data associated with captured stream data. A data drift determiner determines a data drift in the inference data by comparing the data against reference data generated using a golden model. The data drift indicates a loss of accuracy in the inference data. A gateway model maintains one or more models in a model cache for update the model. The gateway model instructs the one or more servers to train the new model. The gateway model transmits the trained model to update the model in the on-premises edge server. Training the new model includes determining an on-premises edge server with computing resources available to train the new model while generating other inference data for incoming stream data in the data analytic pipeline.

20 Claims, 9 Drawing Sheets

(58) Field of Classification Search
CPC . G06N 5/04; G06V 20/58; G06V 5/04; G06F 9/5038; G06F 18/2148; G06F 9/5083; G06F 2209/509; G06Q 10/083; H04L 2012/5631; H04W 24/02
See application file for complete search history.

(56) References Cited

U.S. PATENT DOCUMENTS

| | | | |
|---|---|---|---|
| 11,915,174 B2* | 2/2024 | Moorthy | G06Q 10/06312 |
| 11,983,094 B2* | 5/2024 | Downie | G06F 11/3698 |
| 2019/0114537 A1* | 4/2019 | Wesolowski | G06N 3/084 |
| 2019/0340167 A1* | 11/2019 | Raman | G06F 16/2365 |
| 2020/0013159 A1 | 1/2020 | Ito | |
| 2021/0334695 A1* | 10/2021 | Raj | G06F 11/3409 |
| 2022/0084272 A1* | 3/2022 | Wang | G06N 3/045 |
| 2022/0172100 A1* | 6/2022 | Balasubramanian | G06V 10/776 |
| 2022/0172109 A1* | 6/2022 | Duesterwald | G06N 20/00 |
| 2022/0172342 A1* | 6/2022 | Zepeda Salvatierra | G06V 30/19147 |
| 2022/0180866 A1* | 6/2022 | Sharifi | G10L 25/78 |
| 2022/0188569 A1* | 6/2022 | Ananthanarayanan | G06V 20/58 |
| 2022/0188694 A1* | 6/2022 | Suzani | G06F 17/18 |
| 2022/0198278 A1* | 6/2022 | O'Donncha | G06N 3/047 |
| 2022/0253570 A1* | 8/2022 | Beale | G06F 3/061 |
| 2022/0253647 A1* | 8/2022 | Perkins | G06N 20/20 |
| 2022/0414521 A1* | 12/2022 | Xu | G06N 20/00 |
| 2024/0152820 A1* | 5/2024 | Singh | H04W 24/02 |
| 2024/0276399 A1* | 8/2024 | Vasudevan | H04L 43/0876 |

FOREIGN PATENT DOCUMENTS

| | | | | |
|---|---|---|---|---|
| CA | 3135226 A1 | * | 11/2020 | G06F 17/18 |
| CA | 3003617 C | * | 6/2022 | G06F 40/174 |
| CN | 202406144 U | * | 8/2012 | |
| CN | 110557287 A | * | 12/2019 | |
| CN | 110990155 A | * | 4/2020 | G06F 9/5083 |
| CN | 111967834 A | * | 11/2020 | G06Q 10/083 |
| CN | 111967835 A | * | 11/2020 | G06Q 10/083 |
| CN | 112835698 A | * | 5/2021 | |
| CN | 113711243 A | * | 11/2021 | G06N 20/00 |
| CN | 112188627 B | * | 5/2022 | G06F 9/5027 |
| DE | 112020001253 T5 | * | 12/2021 | G06K 9/00979 |
| EP | 3627399 B1 | * | 8/2024 | G06F 16/902 |
| KR | 102093764 B1 | * | 6/2019 | |
| WO | WO-2022203652 A1 | * | 9/2022 | G06N 20/00 |

OTHER PUBLICATIONS

Bhardwaj, et al., "Ekya: Continuous Learning of Video Analytics Models on Edge Compute Servers", In Repository of : Arxiv.Org, Cornell University Library, 201 Olin Library Cornell University Ithaca, NY 14853, Dec. 19, 2020, pp. 1-15.

"International Search Report and Written Opinion Issued in PCT Application No. PCT/US22/029945", Sep. 20, 2022, 12 Pages.

Communication under Rule 71(3) Received in European Patent Application No. 22735675.5, mailed on Jan. 20, 2025, 07 pages.

* cited by examiner

310A

310B

300

CONTINUOUS LEARNING MODELS ACROSS EDGE HIERARCHIES

With the advent of 5G, Multi-access Edge Computing (MEC) with data analytics pipelines has become important to improve performance of cloud services. In MEC, there is a hierarchy of devices and servers. For instance, Internet-of-Things (IoT) devices, e.g., cameras of personal or commercial security systems, municipal traffic cameras, and the like, capture and transmit stream data (e.g., video data) to cell towers. The cell towers relay the stream data to edge servers in on-premises (i.e., "on-prem") edges as uplink data traffic. The on-premises edge servers may generate inferences based on the stream data and transmit the inference data to network servers at network edges of a cloud infrastructure. The network servers may also generate inference data and transmit the data to cloud servers for further processing.

Due to physical constraints (both dimensional and geographic), the edge servers at the on-premises edges have limited computing power and memory capacity when compared to the cloud servers because the edge servers are geographically distributed at locations proximal to the cell towers. It is cost-prohibitive and/or physically infeasible to install extensive computing resources at the edge servers, but transmitting the raw uplink stream data to the cloud via a radio access network (RAN) falls short of meeting real-time data processing needs and involves significant bandwidth utilization. As a result, some generating of inference is performed at on-premises edge servers, including limited analytics tasks on stream data (e.g., video, audio, images) captured by Internet of Things (IoT) devices. The data analytics at on-premises edge servers include object recognition (e.g., recognizing a person or a thing appearing on a video stream) based on trained models. For example, a service application may use one trained model for identifying a person and another trained model for identifying an automobile in a video stream.

In aspects, video analytics may refer to processing video data captured by IoT devices (e.g., video cameras or other image-capturing devices) to make a series of inference determinations. The inference determinations are often made using machine learning based on trained models, which require loading parameters into a graphics processing unit (GPU) and reserving enough memory space for training data and any intermediate data that is generated during inference execution of the model. The inference determinations require intensive computing and/or memory resources. Traditional systems in MEC allocate video analytics processing based on an availability of computing and memory resources in respective devices and/or servers in the video analytics pipeline. For example, IoT devices such as video cameras, which often have the most limited computing and memory resources, may merely capture video stream data. On-premises edge servers may process the captured video frames in a very limited manner (e.g., region of interest recognition); whereas cloud servers with robust computing and memory resources may perform the most computing-intensive video analytics in the MEC.

Although an IoT device may be monitoring a set location or scene, features of data captured by the on-site IoT device may vary over time. For example, an on-site surveillance video camera may capture a traffic scene of a roadway all day. Some images are captured during daylight hours while others are captured at night. Thus, some images depict the scene on a bright sunny day while other images depict the scene when it is rainy or overcast. Accordingly, some video frames may depict a clear image of the scene (e.g., on a clear, sunny day) while others may depict the scene with low light and shining headlights from vehicles, or with headlight reflections as a result of rain.

Accordingly, the on-premises edge servers receive video frames of scenes having varying features over time. However, data analytics models are highly specialized to specific types of features to attain accuracy. For the on-premises edge servers to generate inferences with accuracy using limited computing resources, the on-premises edge servers need data analytics models trained on the features of the video frames at the time. But as the features change over time, a data analytics model used for generating inference at a previous time is no longer appropriate for the current features. This loss of accuracy in the inference data (i.e., data drift) raises issues in the quality of data analytics.

Accordingly, there arises a tension between computing/memory resource allocation and the accuracy of data analytics at each level of the hierarchy in MEC. It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure relate to continuous learning models in edge servers across hierarchies in multi-access edge computing (MEC) systems. As noted above, the MEC involves a hierarchy of datacenters and servers with a spectrum of varying levels of resource availability and geographical localities without limiting a number of levels in the hierarchy. In aspects, the term "on-premises edge" may refer to a datacenter at a remote location at the far-edge of a private cloud, which is in proximity to one or more cell towers. The RAN, in combination with a core network of a cloud service provider, represents a backbone network for mobile wireless telecommunications. For example, cell towers may receive and transmit radio signals to communicate with IoT devices (e.g., video cameras) over a RAN (e.g., 5G). Various service applications may perform different functions, such as network monitoring or video streaming, and may be responsible for evaluating data associated with the data traffic. For instance, a service application may perform data analytics, such as object recognition (e.g., object counting, facial recognition, human recognition) on a video stream based on a model trained for that purpose.

When an on-premises edge server receives video stream data (e.g., from a video camera over a RAN) from IoT devices, the on-premises edge server performs inference determinations on the video stream data using a model. To generate inferences that are accurate under a constrained resource environment of an on-premises edge server, the model is specifically tailored for generating inferences of particular types. As an example, an on-premises edge server may be tasked with determining a number of vehicles of various colors and shapes passing through a scene captured by a video camera. The on-premises edge server uses a model specializing in identifying the number of vehicles of various colors and shapes. To strike a balance between generating inferences with accuracy and consuming computing resources, the on-premises edge server may use a model that is fine-tuned for videos taken in sunny, daylight conditions but not during nighttime conditions. Accordingly, use of the same model for performing analytics on videos captured during different conditions results in generating inferences with less accuracy. The term "data drift" refers to a degree of inaccuracy of the inference data. Data drift occurs over time as features and/or patterns of captured data change over time.

In aspects, a network edge server may determine a level of data drift based on inference data generated by an on-premises edge server. The network edge server trains (or instructs one of the on-premises edge servers to train) a model based on the determined data drift. The network server may then transmit the trained model to the on-premises edge server to replace or update the previous model. The on-premises edge server receives the model and continues generating inferences on captured data from IoT devices.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

Figure 3B:
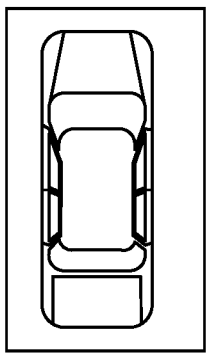
Figure 3B:
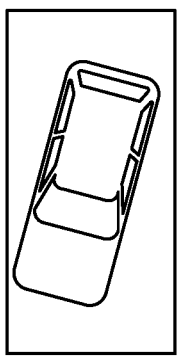
Figure 3C:
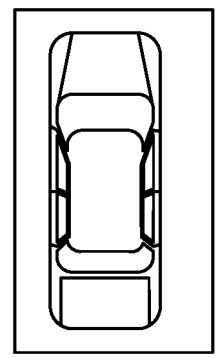
Figure 3A:
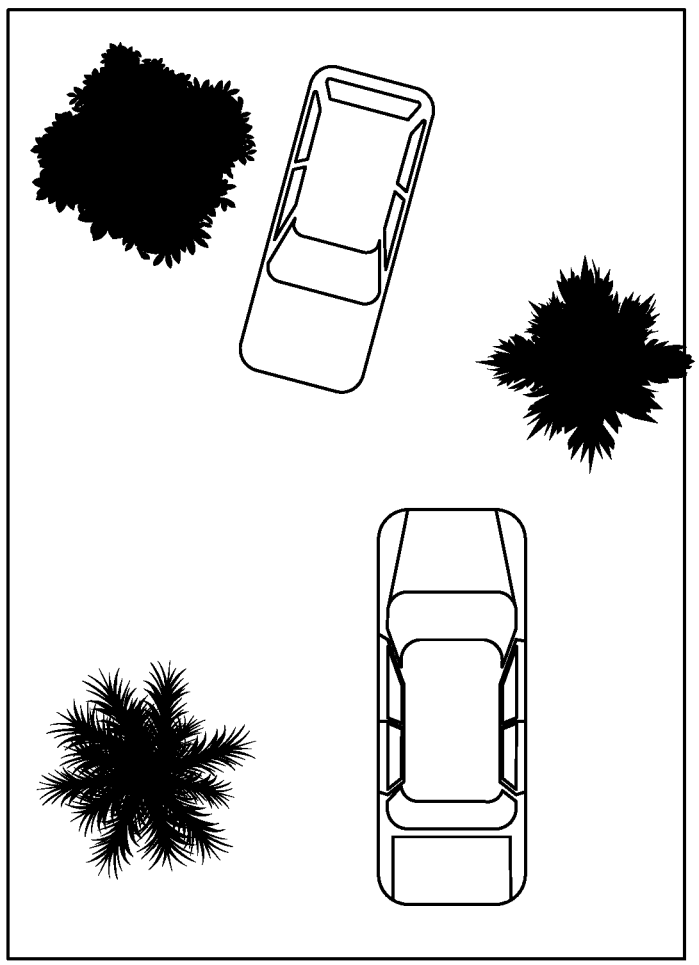

FIGS. 3A-C illustrate examples of images in accordance with aspects of the present disclosure.

Figure 4:
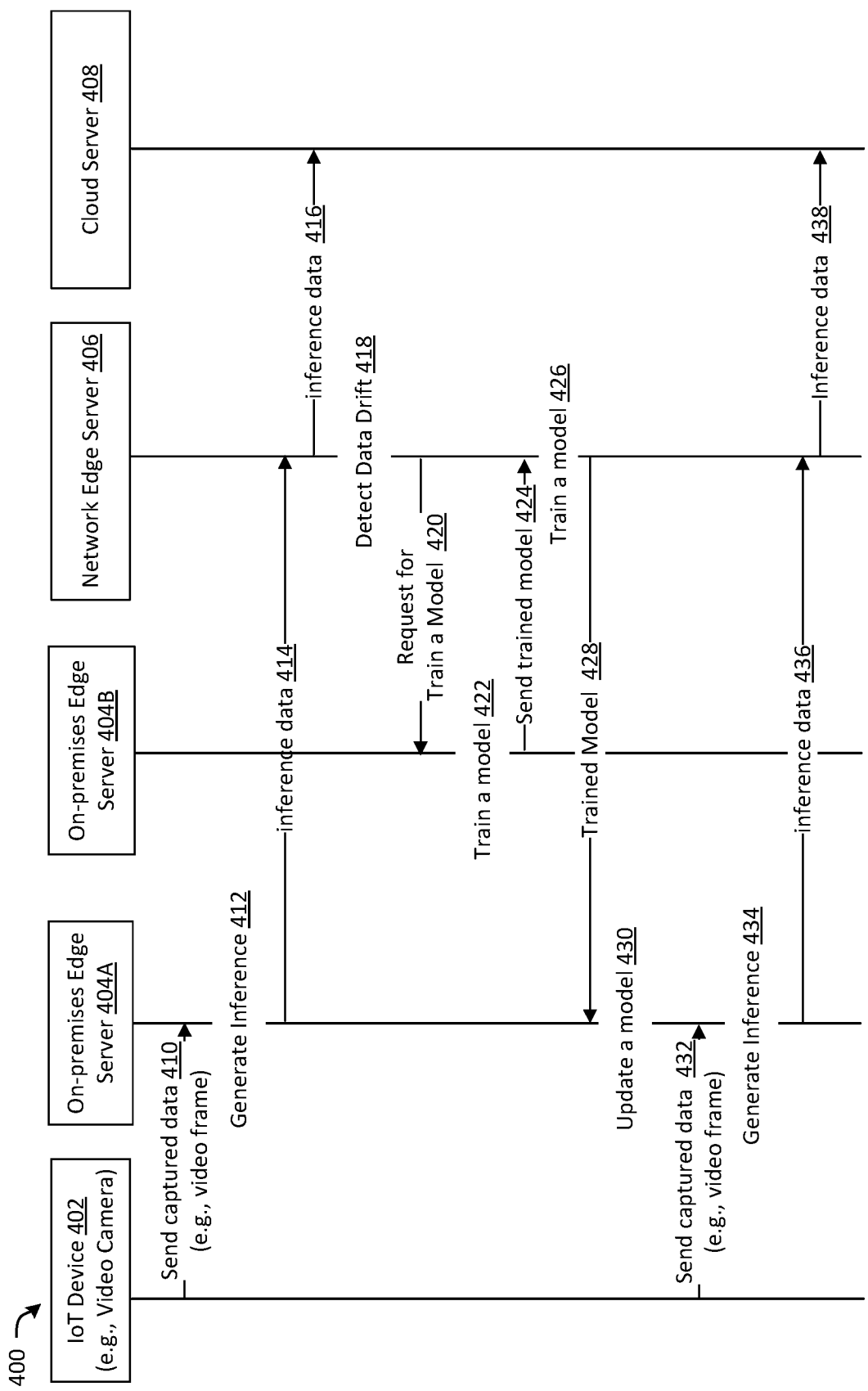

FIG. 4 illustrates an example of a method for continuous training of models in accordance with aspects of the present disclosure.

Figure 5:
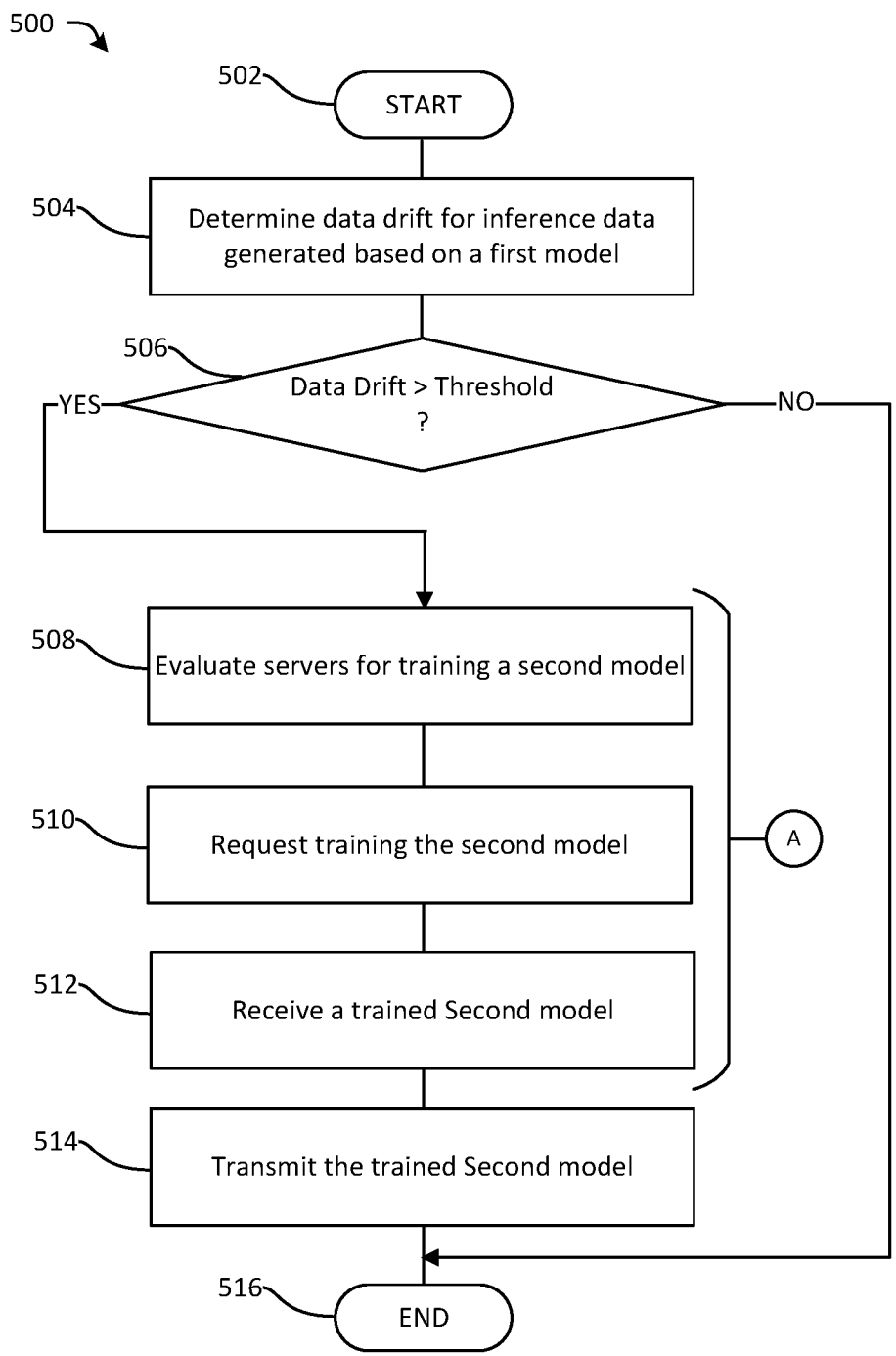

FIG. 5 illustrates an example of a method for continuous training of models in accordance with aspects of the present disclosure.

Figure 6:
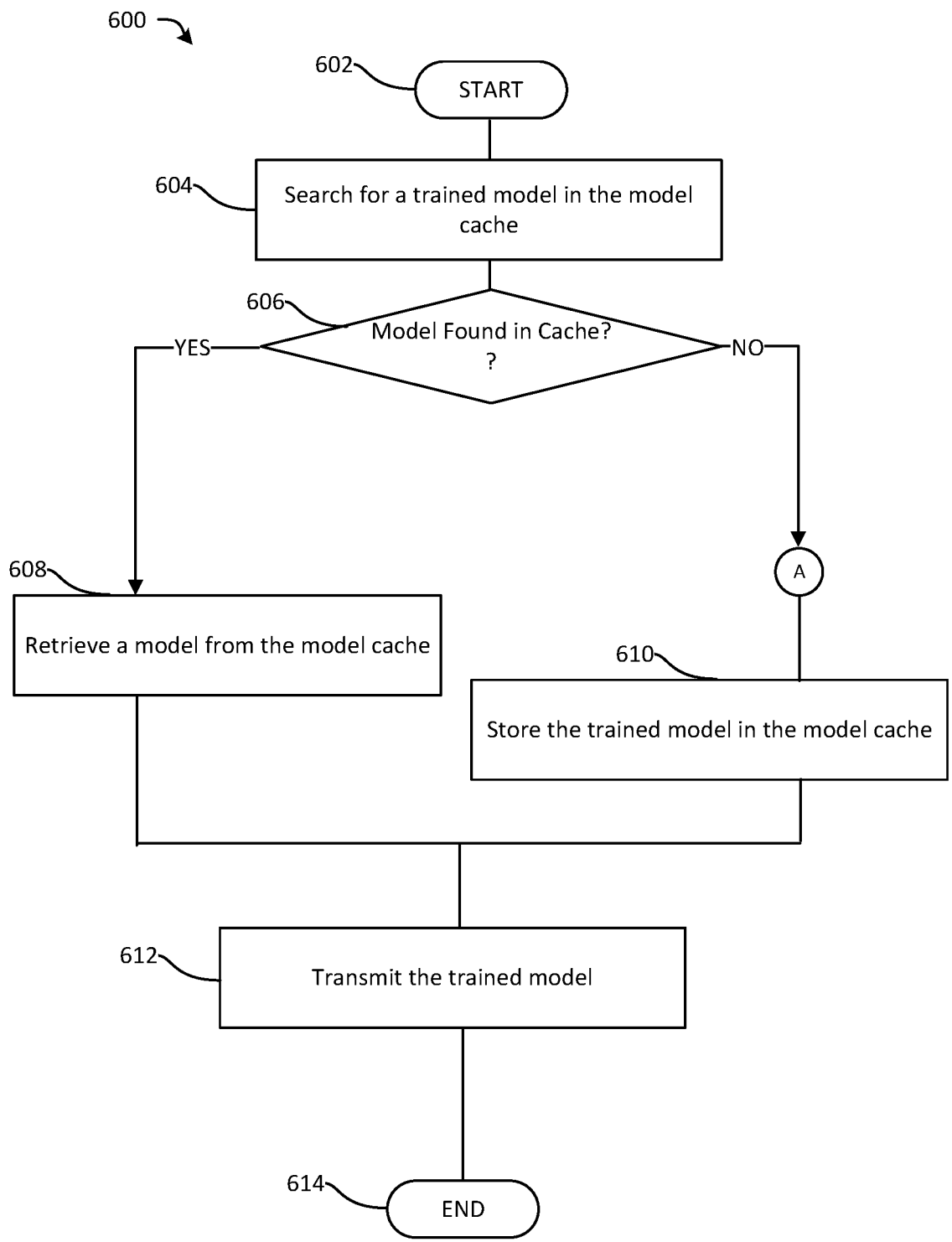

FIG. 6 illustrates an example of a method for continuous training of models in accordance with aspects of the present disclosure.

Figure 7:
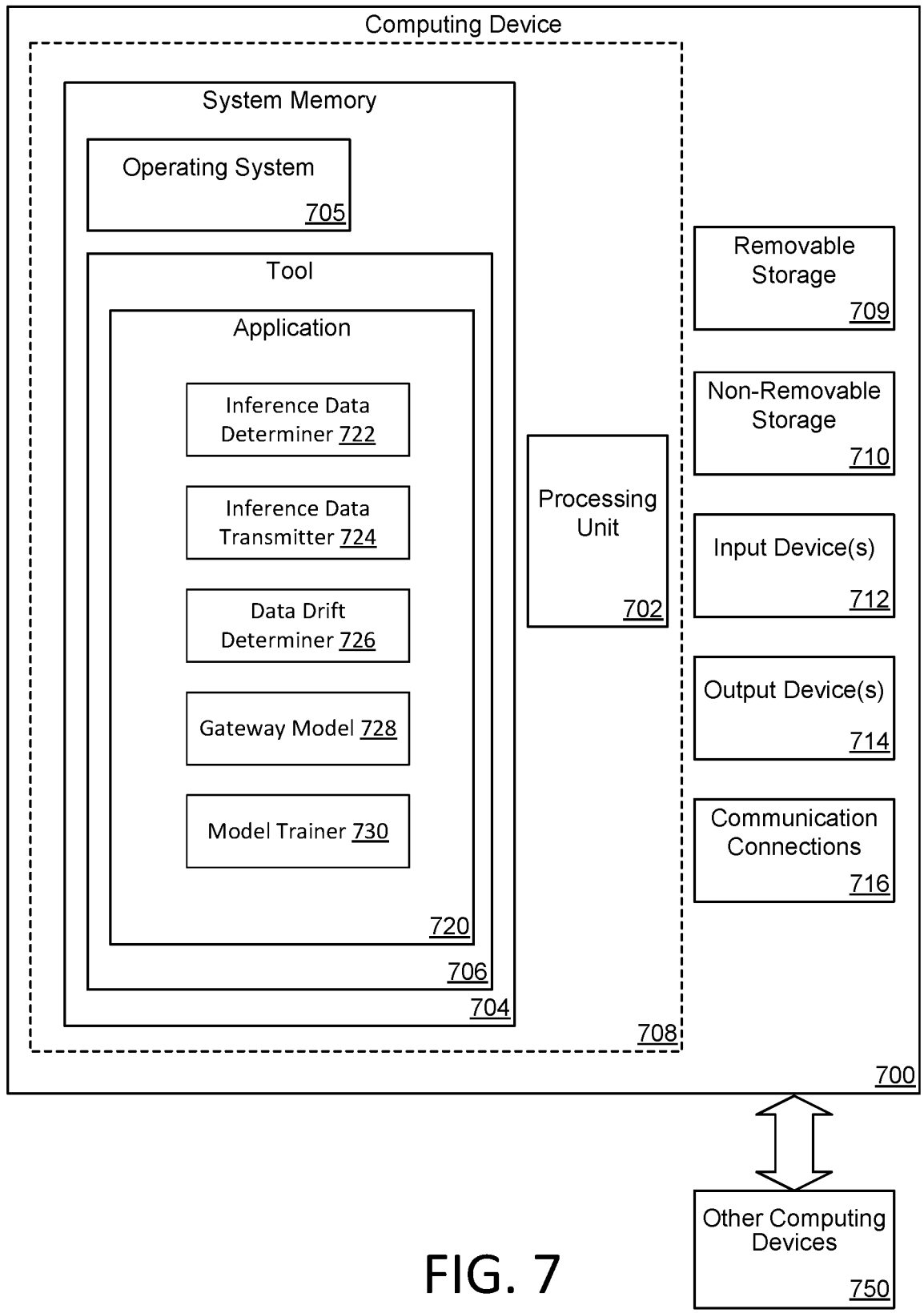

FIG. 7 is a block diagram illustrating example physical components of a computing device with which aspects of the disclosure may be practiced.

Figure 8A:
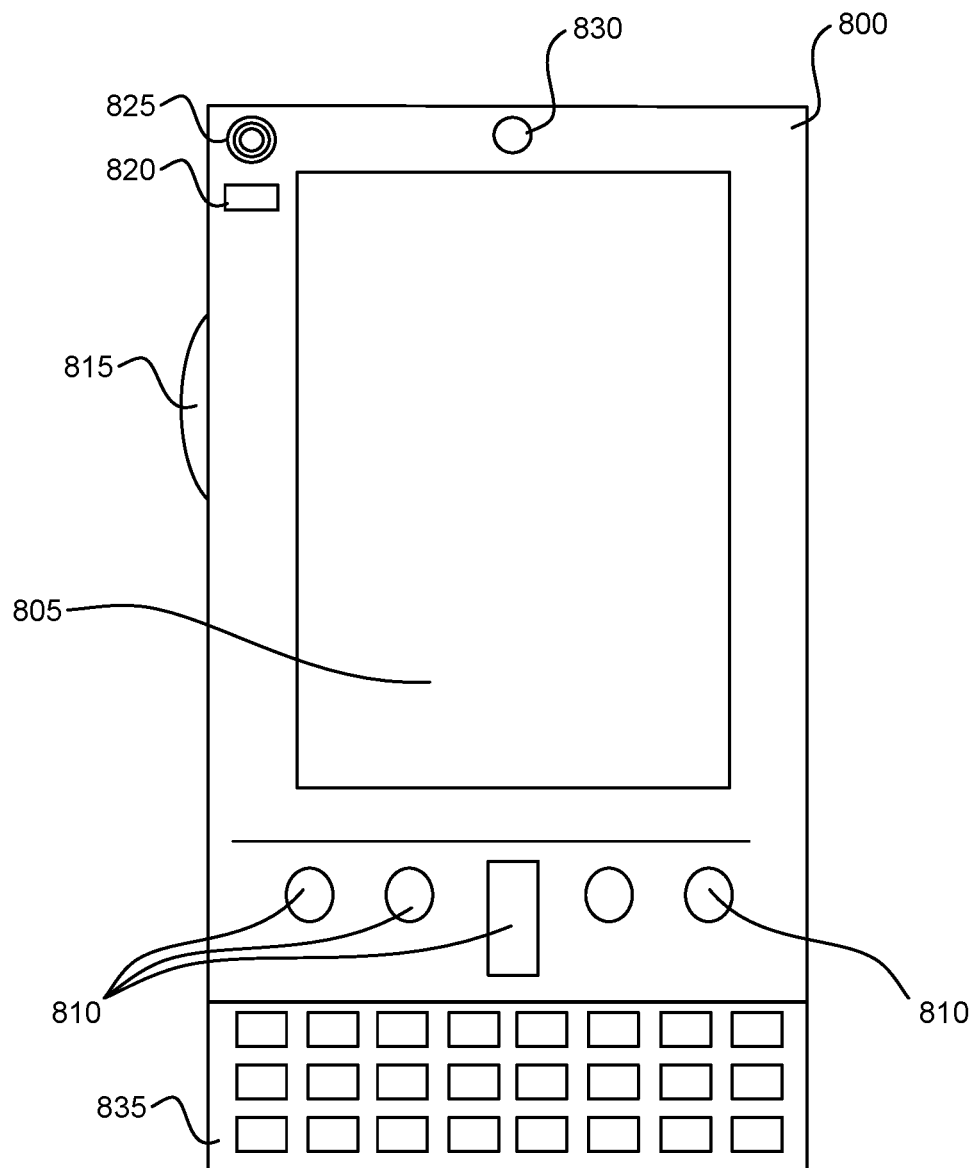

FIG. 8A is a simplified diagram of a mobile computing device with which aspects of the present disclosure may be practiced.

Figure 8B:
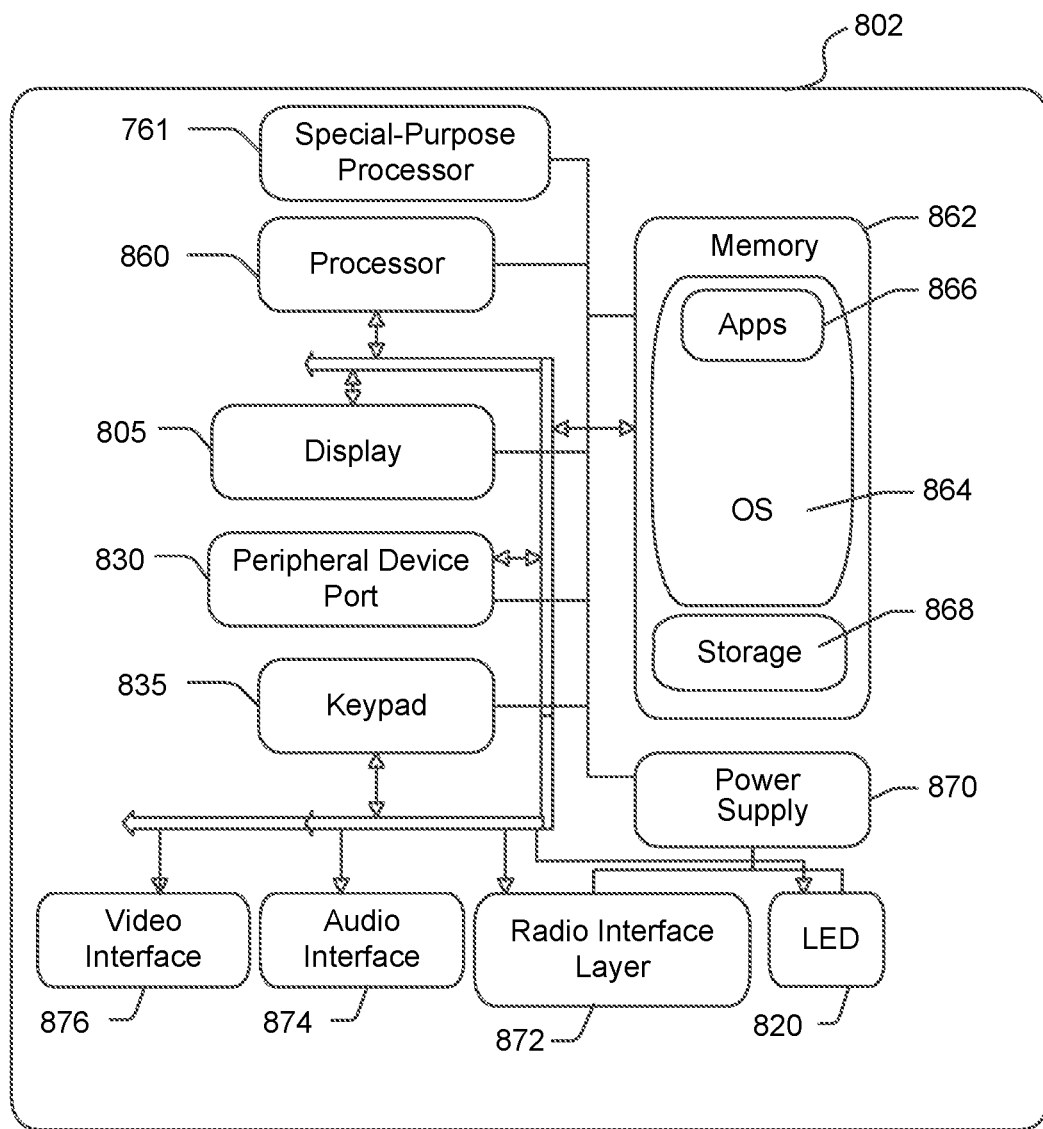

FIG. 8B is another simplified block diagram of a mobile computing device with which aspects of the present disclosure may be practiced.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Wireless telecommunication networks may be implemented by cloud RAN services. In this case, IoT devices may transmit and receive data from cell towers, which may connect via cloud services to a public network (e.g., the Internet) and/or private networks. The cloud service provider may implement a vast array of virtual servers and other computing resources to dynamically scale computing capacity as needed based on the volume of data traffic. To enable real-time processing of data traffic, an on-premises edge server may be relatively close (e.g., a few kilometers) to a cell tower. However, due to the physical and geographical constraints associated with a RAN, the on-premises edge servers may include limited computing and memory capacity as compared to network servers at the network edge and cloud servers in the cloud. Accordingly, the servers form a hierarchical structure with the distributed on-premises edges at the downstream end, the network edges in the middle, and the cloud at the root. In aspects, there may be two or more layers in the hierarchical structure. A hierarchical structure with two layers may include on-premises edges in a first layer and the cloud in a second layer. A hierarchical structure with three layers may include on-premises edges in a first layer, network edges in a second layer, and the cloud in a third layer. In some aspects, the hierarchical structure may include any number of layers, including devices, on-premises edges, network edges, the cloud, or the like.

As discussed in more detail below, the present disclosure relates to continuous learning models across edge hierarchies for performing data analytics. Examples of data analytics include video analytics, image analytics, audio analytics, and the like. Typically, application services for data analytics determine inferences based on data captured by IoT devices (e.g., video cameras) and transmitted via uplink to cell towers, which transmit the captured data to on-premises edge servers.

Within the limited computing and memory resources, an on-premises edge server may execute one or more service applications on a central processing unit (CPU) and/or accelerators such as a graphics processing unit (GPU). The service applications rely on models to analyze stream data (e.g., video stream data from IoT devices) and create abstracted data for further analyses in the cloud. The abstracted data may include identities of object types and/or object counts recognized and/or predicted based on analytics performed at the on-premises edge server. Since computing resources in the on-premises edge servers are scarce, the on-premises edge servers use models that are specifically tailored for processing particular types of data as captured by the IoT devices. For example, a model may be trained to accurately determine a number of cars in a video frame under daylight conditions. Data drift may occur when the on-premises edge server uses the same model for performing analytics on incoming videos captured during nighttime conditions.

The disclosed technology addresses the issue of data drift associated with inference generation at on-premises edge servers by continuously training models based on varying conditions to update the models used by the on-premises edge servers. A network edge server may determine a level of data drift based on received inference data from an on-premises edge server by comparison to reference data of a golden model. The network edge server may then train (and/or instruct the on-premises edge server to train) a new model (or update an existing model) to reduce the data drift. The network edge server may maintain a model cache to store the trained model. In aspects the model is a new model that replaces the model used by the on-premises server. In some other aspects, the updated model is a fine-tuned version of the existing model with additional features.

Figure 1:
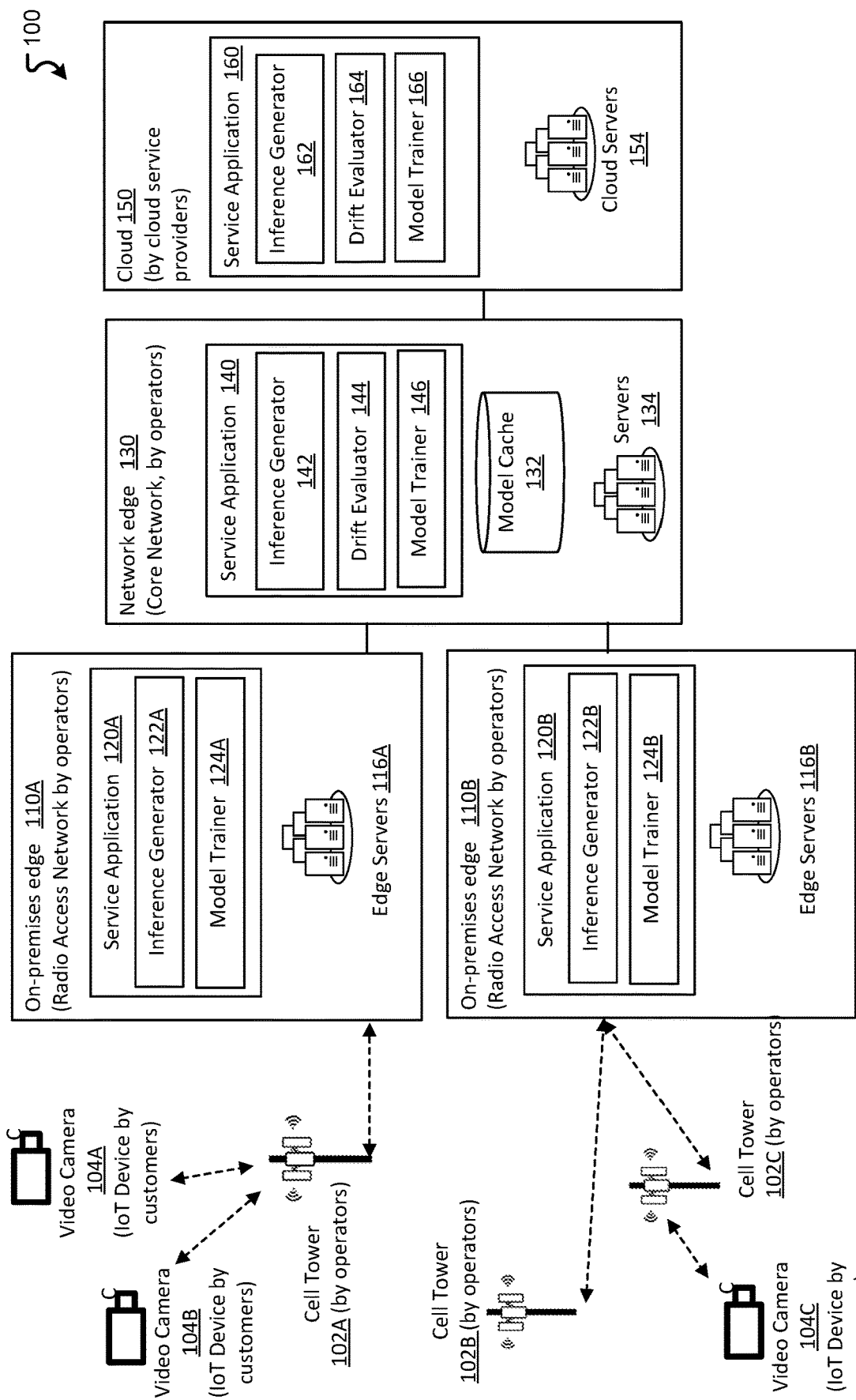
FIG. 1 illustrates an overview of an example system for continuous learning of models across edge hierarchies in accordance with aspects of the present disclosure.

FIG. 1 illustrates an overview of an example system 100 for continuous learning models across edge hierarchies under multi-access edge computing in accordance with the aspects of the present disclosure. Cell towers 102A-C transmit and receive wireless communications with IoT devices (e.g., video cameras, health monitors, watches, appliances, etc.) over a telecommunications network. Video cameras 104A-C represent examples of IoT devices communicating with the cell towers 102A-C in the field. In aspects, the video cameras 104A-C are capable of capturing video images and transmitting the captured video images over a wireless network (e.g., the 5G cellular wireless network) to one or more of the cell towers 102A-C. For example, respective video cameras 104A-C may capture scenes for video surveillance, such as traffic surveillance or security surveillance. The example system 100 further includes on-premises edges 110A-B (including edge servers 116A-B), a network edge 130 (including core network servers), and a cloud 150 (including cloud servers responsible for providing cloud services). In aspects, the example system 100 corresponds to a cloud RAN infrastructure for a mobile wireless telecommunication network.

As illustrated, the on-premises edges 110A-B are datacenters that are part of the cloud RAN. In aspects, the on-premises edges 110A-B enable cloud integration with a radio access network (RAN). The on-premises edges 110A-B include edge servers 116A-B, which process incoming data traffic and outgoing data traffic. The edge servers 116A-B may execute service applications 120A-B. In aspects, the on-premises edges 110A-B are generally geographically remote from the datacenters associated with the core network and cloud services. The remote site is in geographic proximity to respective cell towers. For example, the proximity may be within about a few kilometers. As illustrated, the on-premises edge 110A is in proximity to the cell tower 102A and the on-premises edge 110B is in proximity to the cell towers 102B-C. In aspects, the inference generator 122A and the inference generator 122B respectively generate inferences based on applying a machine learning model to data streams (e.g., video streams) captured by the IoT devices (e.g., video cameras 104A-C). In aspects, the inference generators 122A-B use pre-trained models to generate inferences. The inference generators 122A-B transmit the inference data to an upstream server (e.g., the servers 134 of the network edge 130).

In further aspects, as datacenters become closer to the cloud 150, server resources (including processing units and memory) become more robust and powerful. As an example, cloud servers 154 may be more powerful than servers 134, which may be more powerful than the edge servers 116A-B. The service applications 120A-B may respectively include model trainers 124A-B. The model trainers 124A-B may train models when the respective edge servers 116A-B have resources available for training while generating inferences based on data captured by the video cameras 104A-C. In aspects, the model trainers 124A-B train models in response to a command received from the network edge 130.

In aspects, the network edge 130 is at a regional datacenter of a private cloud service. For example, the regional datacenter may be about tens of kilometers from the cell towers 102A-C. The network edge 130 includes service application 140 that when executed performs data analytics. For example, the service application 140 includes video ML model or inference generator 142, which performs and manages video analytics using machine learning technologies, such as neural networks, to train analytics models. The network edge 130 may comprise memory resources that are more expansive than the memory resources available to the edge servers 116A-B of the on-premises edges 110A-B. In aspects, the service application 140 includes a drift evaluator 144 and a model trainer 146. The drift evaluator 144 receives inference data from the on-premises edges 110A-B and determines a degradation of accuracy of the inference data. In aspects, the drift evaluator 144 compares the inference data against reference data generated by a golden model. When the inference data from the on-premises edges 110A-B deviates from the reference data by more than a predetermined threshold, the drift evaluator 144 determines that the inference data has unacceptable data drift.

In this case, the drift evaluator 144 may determine that the inference generators 122A-B need to be updated with a new or fine-tuned model to improve accuracy. Accordingly, the drift evaluator 144 may identify one of edge servers 116A-B (or the network edge 130) to train a new model or fine-tune the existing model. When an on-premises edge 110A-B has sufficient computing resources for training (or fine-tuning) a model, in addition to ongoing generation of inference data, the drift evaluator 144 may instruct the available on-premises edge 110A-B to train the model. As an example, the drift evaluator 144 may determine that inference data generated via the inference generator 122A at the on-premises edge 110A has data drift that is greater than the predetermined threshold. A model trainer 124B of a different on-premises edge (e.g., the on-premises edge 110B) may have capacity for training a new model (or fine-tuning the existing model). Accordingly, the drift evaluator 144 may instruct the model trainer 124B to train a new model and transmit the new model to the drift evaluator 144. Upon receiving the newly trained (or fine-tuned) model, the drift evaluator 144 may transmit the new model to the on-premises edge 110A. Thereafter the inference generator 122A may start using the new or fine-tuned model to generate inferences with improved accuracy.

The cloud 150 (service) includes cloud servers for performing resource-intensive, non-real-time service operations. In aspects, one or more servers in the cloud 150 may be at a central location in a cloud RAN infrastructure. In this case, the central locations may be hundreds of kilometers from the cell towers 102A-C. In aspects, the cloud 150 includes service application 160 for performing data analytics. The service application 160 may perform similar processing tasks as a service application 140 in the network edge 130.

In aspects, the on-premises edges 110A-B, which are closer to the cell towers 102A-C and to the video cameras 104A-C (or IoT devices) than the cloud 150, may provide real-time processing. In contrast, the cloud 150, which is the furthest from the cell towers 102A-C and video cameras 104A-C in the cloud RAN infrastructure, may provide processing in a non-real-time manner (e.g., such as training models). When computing resources are available, one or more of the model trainers 124A-B may be available to train a new model or fine-tune an existing model.

The service applications 120A-B include program instructions for processing data according to predetermined data analytics scenarios on the edge servers 116A-B. The predetermined analytics may include, for example, inference generators 122A-B for generating inferences based on captured data and model trainers 124A-B for training or fine-tuning models utilized by the inference generators 122A-B. In aspects, the inference generators 122A-B perform video analytics and generates inference data by extracting and identifying objects from video stream data according to a trained model. For example, the inference generators 122A-B may rely on a plurality of trained models to identify different types of objects (e.g., trees, animals, people, automobiles, etc.), to generate a count of objects (e.g., a number of people in a video frame), and/or identify a particular object (e.g., a particular person based on facial recognition). In aspects, each model may be trained to identify a different type of object.

The incoming video stream may include background data and object data, which IoT devices (e.g., the video cameras 104A-C) captured and transmitted to the cell towers 102A-C. For example, the service applications 120A-B may analyze the video stream and extract portions of the video stream as regions of interest, which regions of interest may comprise object data as opposed to background data. Once extracted, the regions of interest may be evaluated to recognize objects (e.g., a face of a person), as described above, or the service applications 120A-B may transmit the extracted regions of interest (rather than the full video stream) to the cloud for further processing (e.g., to identify a person by performing facial recognition on the face of the person). In aspects, the edge servers 116 includes computing and memory resources that are limited while the servers 134 at the network edge 130 include resources that are sufficiently robust to perform facial recognition on the video stream to identify a name of a person.

In aspects, the on-premises edge 110A receives data captured by the video cameras 104A-B that connect to the cell tower 102A. The on-premises edge 110B receives data captured by the video camera 104C that connects to the cell tower 102C. Both edge servers 116A-B generate inference data based on received data from respective video cameras 104A-C. In aspects, the edge servers 116B may have more computing resources available to train a new model because the edge servers 116A generate inference data for data captured and transmitted by at least two video cameras 104A-B whereas the edge servers 116B receive stream data from a single video camera 104C.

As described above, the service applications 120A-B may use one or more models for recognizing and/or generating inference data when performing data analytics on video stream data. Respective models may be fine-tuned for performing distinct functions. For example, a model may accurately recognize faces of people and determine regions within video frames that correspond to the recognized faces. Another model may be fine-tuned for recognizing automobiles (including particular automobile makes or models) that appear in the video frames. Some other model may be fine-tuned for recognizing and extracting voices of distinct people from audio data. In aspects, the service applications 120A-B may use the one or more models for generating inference data.

In contrast to the on-premises edges 110A-B, network edge 130 has more computational and memory resources to perform video analytics that are more resource intensive and/or complex. Thus, the service application 140 executing at the network edge 130 may both generate inference data and manage models for respective on-premises edges 110A-B. In aspects, the network edge 130 includes a model cache 132. The model cache 132 is storage memory hat stores generated and trained models for updating models utilized at the respective on-premises edges 110A-B.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
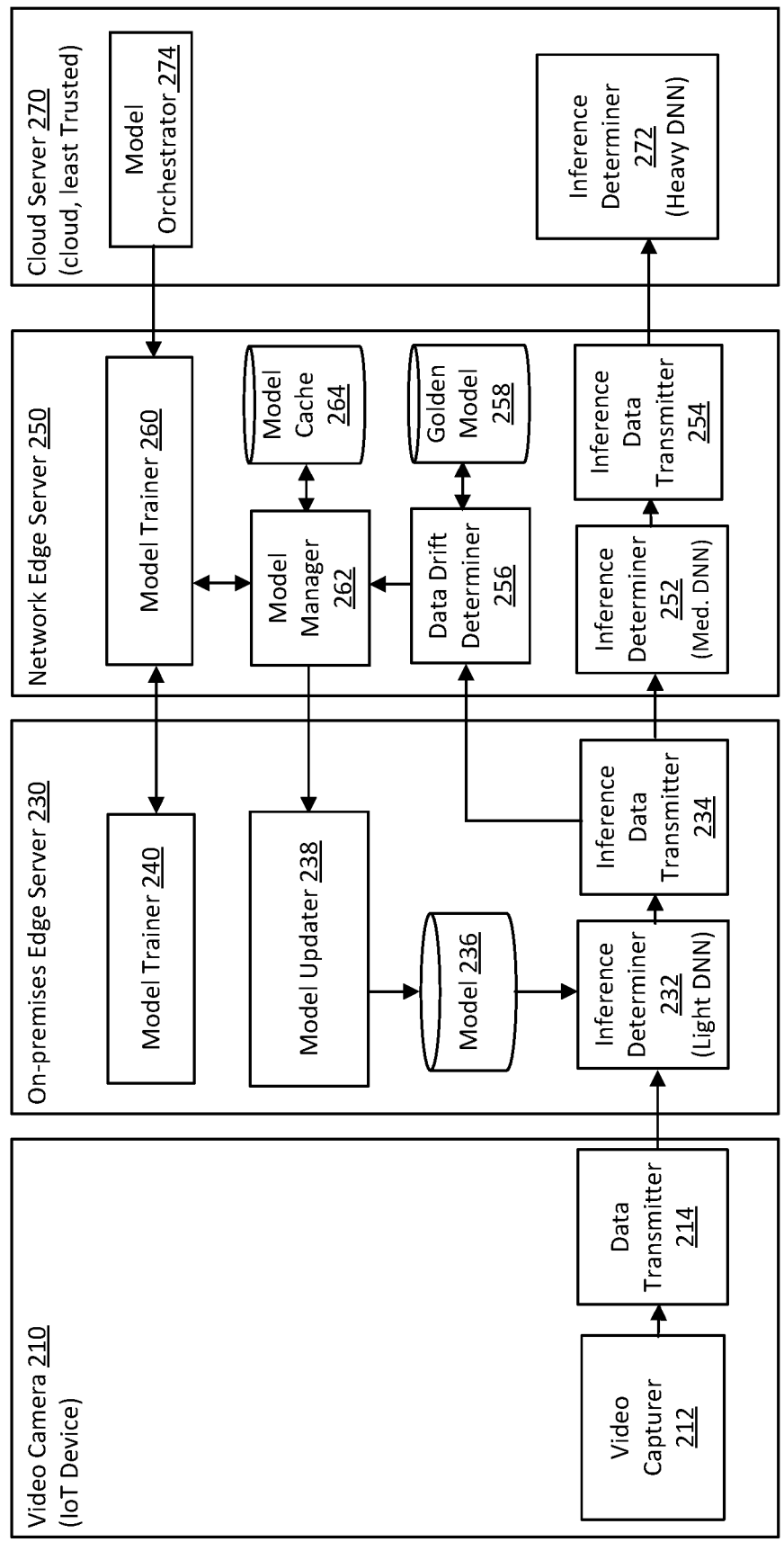
FIG. 2 illustrates an example system for continuous learning of models in accordance with aspects of the present disclosure.

FIG. 2 illustrates an example system for continuous learning models across edge hierarchies in accordance with aspects of the present disclosure. The system 200 includes video camera 210 (e.g., IoT device), on-premises edge server 230, network edge server 250, and cloud server 270. In aspects, the video camera 210 (e.g., the video camera 104A as shown in FIG. 1) captures video stream data and transmits the data to the on-premises edge server 230 via a cell tower (e.g., the cell tower 102A as shown in FIG. 1). The video camera 210 includes video capturer 212 and data transmitter 214.

In aspects, the video capturer 212 captures video scenes in the field. Examples of the video scenes may include a video surveillance of a street and/or hallway, capturing videos of objects (e.g., people, automobiles, animals, and the like) passing into and out of the scenes. The data transmitter 214 transmits the captured video stream data to inference determiner 232 (Light Deep Neural Network (DNN)) in the on-premises edge server 230.

The on-premises edge server 230 includes inference determiner 232, the inference data transmitter 234, model 236, model updater 238, and model trainer 240. The inference determiner 232 (light DNN) at the on-premises edge server 230 receives the video steam data from the video camera 210 via a cell tower. In aspects, the inference determiner 232 determines inferences based on the video stream data using a model 236. In aspects, the model 236 is a trained model for generating accurate inference data based on a given condition in which the video camera 210 captures the video stream data. The on-premises edge server 230 provides more computing and memory resources than the video camera 210, but less than the network edge server 250. Accordingly, the inference determiner 232 may use the model 236 (e.g., a light version of a deep neural network) to perform inference operations less complex than the network edge server 250.

The inference data transmitter 234 in the on-premises edge server 230 transmits the determined inference data to the network edge server 250. In particular, the inference data transmitter 234 transmits the inference data to a data drift determiner 256 and an inference determiner 252 (using a medium deep neural network) in the network edge server 250.

The model trainer 240 trains a new model based on instructions from the network edge server 250. In aspects, the model trainer 240 trains the new model when the on-premises edge server 230 has available computing resources for generating or training the new model (or fine-tuning model 236). The model updater 238 receives the new or fine-tuned model from the network edge server 250 and updates the model 236. In aspects, the model updater 238 receives a newly trained model for replacing or updating the model 236 on a periodic basis. In some other aspects, the model trainer 240 receives a new model when the network edge server 250 determines an inaccuracy of inference generation based on model 236 exceeds a threshold level (e.g., resulting in unacceptable data drift of the inference data).

The network edge server 250 includes the inference determiner 252 (medium deep neural network), an inference data transmitter 254, the data drift determiner 256, a golden model 258, a model trainer 260, a model manager 262, and a model cache 264. A combination of the inference determiner 252 and the inference data transmitter 254 is a part of the data analytics pipeline for generating inferences for captured video stream data. A combination of the data drift determiner 256 with the golden model 258, the model manager 262 with the model cache 264, and the model trainer 260 enables continuous training and updating of models used by the on-premises edge server 230. In aspects, the data analytics pipeline includes a sequence of generating inference data based on data captured by IoT devices. The data analytics pipeline may span from the respective IoT devices to the cloud through cell towers, on-premises edge servers, and the network edge servers. The data analytics pipeline includes a sequence of devices and servers in ascending order of computing and memory resources available. Inference data may include description as inferred from content of data captured by one or more IoT devices or previously generated inference data.

The inference determiner 252 at the network edge server 250 generates inference data based on the video stream data from the on-premises edge server 230. In aspects, the network edge server 250 may include a combination of locally-installed servers for meeting near real-time processing requirements and cloud-based, virtual servers with more resources than the locally-installed servers. Accordingly, the inference determiner 252 may utilize a medium level deep neural network and may be capable of performing more complex video analytics than the inference determiner 232.

The data drift determiner 256 receives the inference data from the inference data transmitter 234 of the on-premises edge server 230. The data drift determiner 256 determines whether the inference data is within an allowed range of accuracy. In aspects, the data drift determiner 256 retrieves and uses golden model 258 to generate reference data that falls within the allowed range. The data drift determiner 256 compares the received inference data with the reference data. When the received inference data deviates from the reference data by greater than a predetermined threshold, the data drift determiner 256 determines that the model used by the on-premises edge server 230 should be fine-tuned or updated. In aspects, the golden model 258 is a reference model for detecting or confirming data drift. The golden model 258 may be trained on a larger set of training data and fine-tuned to generate inference data more accurately than the model 236; however, executing the golden model 258 comes at the expense of more computing resources.

When the data drift determiner 256 determines that there is data drift suggesting that model 236 should be updated, the data drift determiner 256 instructs the model manager 262 to update model 236. In aspects, the model manager 262 may manage one or more models that have been previously generated and stored in model cache 264. The model manager 262 queries models stored in the model cache 264 to determine if there is an existing model that is suitable to reduce the data drift. If the model manager 262 finds a model for suitable for replacing model 236, the model manager 262 retrieves the replacement model from the model cache 264 and transmits the replacement model to a model updater 238 at the on-premises edge server 230. If the model manager 262 does not find a replacement model, the model manager 262 instructs model trainer 260 to train a new model. Alternatively, when the on-premises edge server 230 comprises available computing and memory capacity, the model manager 262 may request that model trainer 240 at the on-premises edge server 230 to train a new model. In further examples, if the on-premises edge server 230 does not have sufficient computing resources to train a new model, the model trainer 260 may evaluate other on-premises edge servers for available resources to train the new model.

In aspects, the model manager 262 may receive the trained model and store the trained model in the model cache 264. In other aspects, the model manager 262 may refresh the model cache 264 periodically based on an age of stored models in the model cache 264 and/or a memory capacity of the model cache 264. The model manager 262 transmits the trained model to the model updater 238 at the on-premises edge server 230. In aspects, the model manager 262 may transmit the trained model to the on-premises edge server 230 that generated the less accurate inference data. In some other aspects, the model manager 262 may transmit the trained model to one or more other on-premises edge servers to maintain consistency of the models across the on-premises edge servers.

In some aspects, the model manager 262 prioritizes training of different models. Training may be prioritized due to a scarcity of computing/memory resources at on-premises edge servers or other servers responsible for training models. For example, these servers may not have available resources to train all models at the same time. Factors for determining a priority of training one model over other models may include the degree of data drift of inferences generated by the model. When a degree of data drift is high, inferences are generated with lower accuracy. Accordingly, the model manager 262 may rank models based on a degree of data drift such that models having higher data drift (e.g., lower inference accuracy) are trained before models having lower data drift (e.g., higher inference accuracy). In some examples, models are selected for retraining when a degree of data drift exceeds a drift threshold. The drift threshold may correspond to a predetermined inference accuracy level and a model may be selected for retraining when inferences generated by the model are below the predetermined inference accuracy level.

In aspects, the cloud server 270 provides the most abundant resources as compared to the resources in the video camera 210, the on-premises edge server 230, and the network edge server 250. Accordingly, the inference determiner 272 uses a heavy (e.g., a large scale) deep neural network to generate inferences from the video steam data. The cloud server 270 includes a model orchestrator 274. The model orchestrator 274 maintains consistency of the models used for data analytics in MEC. The model orchestrator 274 transmits instructions to servers at various levels of the MEC hierarchy involved in the data analytics (e.g., video analytics) pipeline (e.g., the pipeline associated with analyzing video stream data from capture at the video camera 210 to complex processing at the cloud server 270). In aspects, the model orchestrator 274 transmits training data for continuously training models across the MEC hierarchy (e.g., the model trainer 260 in the network edge server 250 and the model trainer 240 in the on-premises edge server 230).

In some other aspects, the cloud server 270 may also include a data drift determiner, a golden model, a model manager, a model cache, and a model trainer. As with network edge server 250, the cloud server 270 may detect data drift based on received inference data and may train (or instruct other servers in the hierarchy of servers to train) a model for replacing or updating the existing model utilized by the on-premises edge server 230 and/or the network edge server 250.

As will be appreciated, the various methods, devices, applications, features, etc., described with respect to FIG. 2 are not intended to limit the system 200 to being performed by the particular applications and features described. Accordingly, additional controller configurations may be used to practice the methods and systems herein and/or features and applications described may be excluded without departing from the methods and systems disclosed herein.

FIGS. 3A-C illustrate examples of images associated with generating inference data in accordance with the aspects of the present disclosure. FIG. 3A illustrates an example of a captured video frame 300. In aspects, the video frame 300 is associated with video stream data as captured by a video camera (e.g., the video camera 210 as shown in FIG. 2). For example, the video frame depicts a full-size car, a compact car, and three trees. In aspects, the video camera transmits the image to an on-premises edge server (e.g., the on-premises edge server 230 as shown in FIG. 2).

FIG. 3B illustrates an example of extracted data 310A after inferences are determined (e.g., by the inference determiner 232 as shown in FIG. 2). In aspects, determining inferences includes identifying and extracting one or more regions of interest from an image or video frame and performing data analytics. In an example, the data analytics involve a model trained to analyze video stream data and determine types of cars that appear in various video frames. FIG. 3B includes, as an example, extracted data 310A including two regions of interest that have been extracted from the captured frame (e.g., the video frame 300 as shown in FIG. 3A). One region depicts a full-size car while the other region depicts a compact car. In aspects, the extracted regions of FIG. 3B represent results (e.g., inference data) of determining inferences based on the trained model and, in this case, the inference data accurately identifies the two automobiles captured in the video frame of FIG. 3A.

FIG. 3C illustrates an example of extracted data 310B, which includes data drift after determining inferences based on the trained model. The extracted data 310B includes a region of interest depicting a full-size car. However, the extracted data 310B fails to include the compact car shown in video frame 300. In aspects, the trained model used by an on-premises edge server may be insufficiently trained to accurately recognize a car, e.g., when the car appears in a non-horizontal orientation in the captured video frame or the car appears too near to a tree to distinguish the car as an independent object. As should be appreciated the trained model may be unable to recognize the compact car in the video frame 300 for any number of other reasons.

FIG. 4 illustrates an example method for continuously training models across edge hierarchies in accordance with aspects of the present disclosure. The method 400 includes IoT device 402 (e.g., video camera), on-premises edge servers 404A-B, network edge server 406, and cloud server 408. In aspects, the on-premises edge servers 404A-B may be distinct on-premises edge servers.

The IoT device 402 captures data and sends (410) the captured data to the on-premises edge server 404A. For example, the captured data may be a video frame. Based on evaluating the video frame, the on-premises edge server 404A generates (412) inference data. The on-premises edge server 404A transmits (414) the inference data to the network edge server 406. The network edge server 406 transmits the inference data 416 to the cloud server 408 along the data analytics pipeline.

The network edge server 406 detects data drift in the received inference data (e.g., the extracted data 310B as shown in FIG. 3C). In aspects, the network edge server 406 determines (418) the data drift by comparing the received inference data against reference data (e.g., extracted data 310A as shown in FIG. 3B) using a golden model. Responsive to detecting the data drift, the network edge server 406 sends (420) a request for training a new model to the on-premises edge server 404B. In aspects, the network edge server 406 selects the on-premises edge server 404B for training the new model based on determining an available computing resource capacity for training the new model while concurrently generating inference data received from IoT devices.

The on-premises edge server 404B trains (422) the new model. In aspects, the the network edge server 406 may send training data with the request. The on-premises edge server 404B sends (424) the trained model to the network edge server 406. The network edge server 406 stores (426) the trained model and transmits (428) the trained model to the on-premises edge server 404A to update the model.

The on-premises edge server 404A updates (430) a model with the trained model and waits for further incoming data from the IoT device 402. The IoT device 402 sends (432) captured data (e.g., a subsequent video frame) to the on-premises edge server 404A. The on-premises generates (434) inference data using the updated model. The on-premises edge server 404A transmits (436) the inference data to the network edge server 406. The network edge server 406 transmits (438) the inference data to the cloud server 408 according to the data analytics pipeline. In this case, it may be determined that the inference data generated by on-premises edge server 404A based on the updated model does not exhibit data drift.

FIG. 5 illustrates an example of a method for continuously training models across edge hierarchies in accordance with aspects of the present disclosure. A general order of the operations for the method 500 is shown in FIG. 5. Generally, the method 500 begins with start operation 502 and ends with end operation 516. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3A-C, 4, 6, 7, and 8A-B.

In aspects, the network edge server (e.g., the network edge server 250 as shown in FIG. 2) may perform the method 500. Following start operation 502, the method 500 begins with determine operation 504, which determines data drift associated with inference data generated based on a first model at an on-premises edge server. In aspects, the determine operation 504 includes generating reference data using a golden model and comparing the inference data with the reference data. The determine operation 504 may determine a difference between the inference data and the reference data is representative of data drift. In aspects, the data drift indicates a degree of inaccuracy associated with the inference data generated by the on-premises edge server. For example, the larger the difference between the inference data and the reference data, the more inaccurate the inference data is.

The compare operation 506 compares the data drift to a drift threshold. In aspects, the drift threshold represents a maximum degree of inaccuracy for the inference data. When the data drift does not exceed the drift threshold, the operation proceeds to the end operation 516. When the data drift exceeds the drift threshold, evaluate operation 508 evaluates servers for resource availability to train a second model. In aspects, the evaluate operation 508 identifies one or more on-premises edge servers with available computing resources capacity to train the second model. In some cases, the evaluate operation 508 identifies a single on-premises edge server to train the second model. In other cases, the evaluate operation 508 identifies more than one on-premises edge server and divides the training process among them, with each on-premises edge server training a portion of the model and a model manager (or other component at the network edge server) then merging the trained portions into the second model. In yet another example, the evaluate operation 508 identifies the network edge server to train the model when none of the on-premises edge servers has available computing resources to train the model.

At request operation 510, the network edge server may request one or more identified on-premises edge servers to train a new model (or update an existing model), as described above. In aspects, the request operation 510 includes transmitting training data for training the new or updated model. At receive operation 512, the network edge server may receive a newly trained second model from the one or more servers as requested.

At transmit operation 514, the network edge server may transmit the trained model to the on-premises edge server that sent the inference data having the data drift. In response to the transmit operation 514, the on-premises edge server may update the first model with the trained second model to generate inference data with higher accuracy (and reduced data drift). The method 500 ends with the end operation 516. A series of operations including the determine operation 508 through the receive operation 512 is marked with indicator 'A' as further illustrated by FIG. 6.

As should be appreciated, operations 502-516 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 6 is an example of a method for training models using a model cache in accordance with aspects of the present disclosure. A general order of the operations for the method 600 is shown in FIG. 6. Generally, the method 600 begins with start operation 602 and ends with end operation 614. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3A-C, 4, 5, 7, and 8A-B.

Following start operation 602, the method 600 begins with search operation 604, in which a model manager of the network edge server (e.g., model manager 262 of the network edge server 250 as shown in FIG. 2) searches for a trained second model for replacing the first model in a model cache (the model cache 264 as shown in FIG. 2). In aspects, the search operation 604 searches for a trained second model in response to detecting the data drift associated with the inference data generated by the first model received from the on-promises edge server. When a trained second model is found (606), retrieve operation 608 retrieves the trained second model from the model cache.

When the trained second model is not found in the model cache, the operation proceeds to the series of operations that corresponds to the mark 'A' in FIG. 5 (e.g., the evaluate operation 508, the request operation 510, and the receive operation 512 as shown in FIG. 5). Store operation 610 stores the received trained second model in the model cache. In aspects, the store operation 610 includes refreshing the model cache periodically and/or based on an allowed capacity for the model cache. Transmit operation 612 transmits the trained second model to the on-premises edge server. The method 600 ends with the end operation 614.

As should be appreciated, operations 602-614 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes an inference data receiver 722, an inference data transmitter 724, a data drift determiner 726, a gateway model 728, and a model trainer 730 as described in more detail with regard to FIG. 2. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of the communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., as an operator of servers in the on-premises edge in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., the edge servers 116 and the servers 134, and other servers as shown in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world" via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to training models using a first server and a plurality of servers having less computing resources than the first server across edge hierarchies according to at least the examples provided in the sections below. The method comprises receiving, by the first server from a second server of the plurality of servers, inference data generated based on a first model, wherein content of data captured by one or more sensor devices is evaluated based on the first model to generate the inference data; determining, by the first server, a data drift associated with the received inference data generated based on the first model, wherein the data drift indicates a degree of inaccuracy of the inference data; determining that the data drift exceeds a drift threshold; evaluating computing resources of each of the plurality of servers; determining whether the second server has sufficient computing resources to train a second model while continuing to generate inference data; in response to determining the second server does not have sufficient computing resources, determining at least a third server of the plurality of servers that has sufficient computing resources to train the second model; requesting at least the third server to train the second model; receiving the trained second model from the second server; and causing the first model to be updated with the second model on the plurality of servers. The first server is one of a network edge server or a cloud server of a multi-access edge computing hierarchy, and wherein the second server and the third server are either an on-premises edge server or a network edge server of the multi-access edge computing hierarchy. The method further comprises determining that the third server has sufficient computing resources for training the second model, wherein the third server is distinct from the second server; requesting the third server to train the second model; and receiving from the third server the trained second model. The method further comprises, responsive to determining that the data drift exceeds the drift threshold, searching for the trained second model in a model cache at the first server; and retrieving the second model from the model cache. The drift threshold corresponds to a predetermined inference accuracy level, and wherein a model is selected for retraining when inferences generated by the model are below the predetermined inference accuracy level. The inference data is generated by the first server based on captured data received from one or more devices over a wireless network. The inference data includes one or more regions of interest in an image captured by an imaging device.

Another aspect of the technology relates to a system fir training models using a first server and a plurality of servers having less computing resources than the first server across edge hierarchies. The system comprises a processor; and a memory storing computer-executable instructions that when executed by the processor cause the system to: receive, by the first server from a second server of the plurality of servers, inference data generated based on a first model, wherein content of data captured by one or more sensor devices is evaluated based on the first model to generate the inference data; determine, by the first server, a data drift associated with the received inference data generated based on the first model, wherein the data drift indicates a degree of inaccuracy of the inference data; determine that the data drift exceeds a drift threshold; evaluate computing resources of each of the plurality of servers; determine whether the second server has sufficient computing resources to train a second model while continuing to generate inference data; in response to determining the second server does not have sufficient computing resources, determine at least a third server of the plurality of servers that has sufficient computing resources to train the second model; request at least the third server to train the second model; receive the trained second model from the second server; and cause the first model to be updated with the second model on the plurality of servers. The first server is one of a network edge server or a cloud server of a multi-access edge computing hierarchy, and wherein the second server and the third server are either an on-premises edge server or a network edge server of the multi-access edge computing hierarchy. The computer-executable instructions when executed further cause the system to: determine that the third server has sufficient computing resources for training the second model, wherein the third server is distinct from the second server; request the third server to train the second model; and receive from the third server the trained second model. The computer-executable instructions when executed further cause the system to: responsive to determining that the data drift exceeds the drift threshold, search for the trained second model in a model cache at the first server; and retrieve the second model from the model cache. The drift threshold corresponds to a predetermined inference accuracy level, and wherein a model is selected for retraining when inferences generated by the model are below the predetermined inference accuracy level. The inference data is generated by the first server based on captured data received from one or more devices over a wireless network. The inference data includes one or more regions of interest in an image captured by an imaging device.

In still further aspects, the technology relates to a computer-readable medium storing computer-executable instructions for training models using a first server and a plurality of servers having less computing resources than the first server across edge hierarchies. The computer-executable instructions when executed further cause the computer system for training models using a first server and a plurality of servers having less computing resources than the first server to: receive, by the first server from a second server of the plurality of servers, inference data generated based on a first model, wherein content of data captured by one or more sensor devices is evaluated based on the first model to generate the inference data; determine, by the first server, a data drift associated with the received inference data generated based on the first model, wherein the data drift indicates a degree of inaccuracy of the inference data; determine that the data drift exceeds a drift threshold; evaluate computing resources of each of the plurality of servers; determine whether the second server has sufficient computing resources to train a second model while continuing to generate inference data; in response to determining the second server does not have sufficient computing resources, determine at least a third server of the plurality of servers that has sufficient computing resources to train the second model; request at least the third server to train the second model; receive the trained second model from the second server; and cause the first model to be updated with the second model on the plurality of servers. The first server is one of a network edge server or a cloud server of a multi-access edge computing hierarchy, and wherein the second server and the third server are either an on-premises edge server or a network edge server of the multi-access edge computing hierarchy. The computer-executable instructions when executed further cause the system to: determine that the third server has sufficient computing resources for training the second model, wherein the third server is distinct from the second server; request the third server to train the second model; and receive from the third server the trained second model. The computer-executable instructions when executed further cause the system to: responsive to determining that the data drift exceeds the drift threshold, search for the trained second model in a model cache at the first server; and retrieve the second model from the model cache. The inference data is generated by the first server based on captured data received from one or more devices over a wireless network. The inference data includes one or more regions of interest in an image captured by an imaging device.

Any of the one or more above aspects in combination with any other of the one or more aspect. Any of the one or more aspects as described herein.

What is claimed is:

1. A computer-implemented method for training models, comprising:
    receiving, by a first server from a second server of a plurality of servers, inference data generated based on a first model, wherein content of data captured by one or more sensor devices is evaluated by the second server based on the first model to generate the inference data, the inference data describes identifying an object in the content of the captured data, and the second server of the plurality of servers comprises less computing resources than the first server;
    determining, by the first server, a data drift in the received inference data generated based on the first model, wherein the data drift indicates a degree of inaccuracy of the inference data that identify the object in the content of the captured data;
    determining that the data drift exceeds a drift threshold;
    evaluating computing resources of each of the plurality of servers;
    determining whether the second server has sufficient computing resources to train a second model while continuing to generate inference data;
    in response to determining the second server does not have sufficient computing resources, determining at least a third server of the plurality of servers that has sufficient computing resources to train the second model;

requesting at least the third server to train the second model;
receiving the trained second model from the third server; and
causing, by the first server, the first model to be updated with the trained second model on a graphics processing unit (GPU) of the second server of the plurality of servers, thereby causing the second server to execute an inference operation on the GPU using trained second model" and replace with the first model updated with the trained second model for improved accuracy of inferencing a subsequently captured sensor data.

2. The computer-implemented method of claim 1, wherein the first server is one of a network edge server or a cloud server of a multi-access edge computing hierarchy, and wherein the second server and the third server are either an on-premises edge server or a network edge server of the multi-access edge computing hierarchy.

3. The computer-implemented method of claim 2, the method further comprising:
determining that the third server has sufficient computing resources for training the second model, wherein the third server is distinct from the second server;
requesting the third server to train the second model; and
receiving from the third server the trained second model.

4. The computer-implemented method of claim 2, the method further comprising:
responsive to determining that the data drift exceeds the drift threshold, searching for the trained second model in a model cache at the first server; and
retrieving the second model from the model cache.

5. The computer-implemented method of claim 2, wherein the drift threshold corresponds to a predetermined inference accuracy level, the data drift is caused by a brightness of a scene changing over time affecting depiction of the content of data captured by the one or more sensor devices, and wherein a model is selected for retraining when inferences generated by the model are below the predetermined inference accuracy level.

6. The computer-implemented method of claim 2, wherein the inference data is generated by the first server based on captured data received from one or more devices over a wireless network.

7. The computer-implemented method of claim 2, wherein the inference data includes one or more regions of interest in an image captured by an imaging device.

8. A system for training models, the system comprising:
a processor; and
a memory storing computer-executable instructions that when executed by the processor cause the system to:
receive, by a first server from a second server of a plurality of servers, inference data generated based on a first model, wherein content of data captured by one or more sensor devices is evaluated by the second server based on the first model to generate the inference data, the inference data describes identifying an object in the content of the captured data, and the second server of the plurality of servers comprises less computing resources than the first server;
determine, by the first server, a data drift in the received inference data generated based on the first model, wherein the data drift indicates a degree of inaccuracy of the inference data that identify the object in the content of the captured data;
determine that the data drift exceeds a drift threshold;
evaluate computing resources of each of the plurality of servers;
determine whether the second server has sufficient computing resources to train a second model while continuing to generate inference data;
in response to determining the second server does not have sufficient computing resources, determine at least a third server of the plurality of servers that has sufficient computing resources to train the second model;
request at least the third server to train the second model;
receive the trained second model from the third server; and
cause, by the first server, the first model to be updated with the trained second model on a graphics processing unit (GPU) of the second server of the plurality of servers, thereby causing the second server to execute an inference operation on the GPU using the first model updated with the trained second model for improved accuracy of inferencing a subsequently captured sensor data.

9. The system of claim 8, wherein the first server is one of a network edge server or a cloud server of a multi-access edge computing hierarchy, and wherein the second server and the third server are either an on-premises edge server or a network edge server of the multi-access edge computing hierarchy.

10. The system of claim 9, the computer-executable instructions when executed further cause the system to:
determine that the third server has sufficient computing resources for training the second model, wherein the third server is distinct from the second server;
request the third server to train the second model; and
receive from the third server the trained second model.

11. The system of claim 9, the computer-executable instructions when executed further cause the system to:
responsive to determining that the inference data exceeds the drift threshold, search for the trained second model in a model cache at the first server; and
retrieve the second model from the model cache.

12. The system of claim 9, wherein the drift threshold corresponds to a predetermined inference accuracy level, the data drift is caused by a brightness of a scene changing over time affecting depiction of the content of data captured by the one or more sensor devices, and wherein a model is selected for retraining when inferences generated by the model are below the predetermined inference accuracy level.

13. The system of claim 9, wherein the inference data is generated by the first server based on captured data received from one or more devices over a wireless network.

14. The system of claim 9, wherein the inference data includes one or more regions of interest in an image captured by an imaging device.

15. A non-transitory computer-readable recording medium storing computer-executable instructions that when executed by a processor cause a computer system for training models to:
receive, by a first server from a second server of a plurality of servers, inference data generated based on a first model, wherein content of data captured by one or more sensor devices is evaluated by the second server based on the first model to generate the inference data, the inference data describes identifying an object in the content of the captured data, and the second server of the plurality of servers comprises less computing resources than the first server;

determine, by the first server, a data drift in the received inference data generated based on the first model, wherein the data drift indicates a degree of inaccuracy of the inference data that identify the object in the content of the captured data;

determine that the data drift exceeds a drift threshold;

evaluate computing resources of each of the plurality of servers;

determine whether the second server has sufficient computing resources to train a second model while continuing to generate inference data;

in response to determining the second server does not have sufficient computing resources, determine at least a third server of the plurality of servers that has sufficient computing resources to train the second model;

request at least the third server to train the second model;

receive the trained second model from the third server; and cause, by the first server, the first model to be updated with the trained second model on a graphics processing unit (GPU) of the second server of the plurality of servers, thereby causing the second server to execute an inference operation on the GPU using the first model updated with the trained second model for improved accuracy of inferencing a subsequently captured sensor data.

16. The computer-readable recording medium of claim 15, wherein the first server is one of a network edge server or a cloud server of a multi-access edge computing hierarchy, and wherein the second server and the third server are either an on-premises edge server or a network edge server of the multi-access edge computing hierarchy.

17. The computer-readable recording medium of claim 16, the computer-executable instructions when executed further cause the system to:

determine that the third server has sufficient computing resources for training the second model, wherein the third server is distinct from the second server;

request the third server to train the second model; and receive from the third server the trained second model.

18. The computer-readable recording medium of claim 16, the computer-executable instructions when executed further cause the system to:

responsive to determining that the data drift exceeds the drift threshold, search for the trained second model in a model cache at the first server, wherein the data drift is caused by a change on a scene between a sunny daylight and an overcast over time affecting depiction of the content of data captured by the one or more sensor devices; and retrieve the second model from the model cache.

19. The computer-readable recording medium of claim 16, wherein the inference data is generated by the first server based on captured data received from one or more devices over a wireless network.

20. The computer-readable recording medium of claim 16, wherein the inference data includes one or more regions of interest in an image captured by an imaging device.

* * * * *